(12) United States Patent
Boot

(10) Patent No.: US 9,455,885 B2
(45) Date of Patent: Sep. 27, 2016

(54) SYSTEMS, METHODS, AND APPARATUS FOR MODIFYING SENSOR TIME STAMP DATA

(75) Inventor: John Christopher Boot, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 403 days.

(21) Appl. No.: 13/272,623

(22) Filed: Oct. 13, 2011

(65) Prior Publication Data

US 2013/0094372 A1 Apr. 18, 2013

(51) Int. Cl.
*H04L 12/26* (2006.01)
(52) U.S. Cl.
CPC ............. *H04L 43/028* (2013.01); *H04L 43/10* (2013.01); *H04L 43/16* (2013.01); *Y04S 40/168* (2013.01)
(58) Field of Classification Search
CPC .............................. H04L 12/26; H04L 43/028
USPC ......................................................... 370/352
See application file for complete search history.

(56) References Cited

U.S. PATENT DOCUMENTS

| | | | | |
|---|---|---|---|---|
| 7,675,943 | B2 * | 3/2010 | Mosig | 370/503 |
| 2004/0190459 | A1 * | 9/2004 | Ueda et al. | 370/252 |
| 2005/0100054 | A1 * | 5/2005 | Scott et al. | 370/503 |
| 2008/0310321 | A1 * | 12/2008 | Grilli et al. | 370/252 |
| 2009/0172455 | A1 * | 7/2009 | Pind | 713/400 |
| 2010/0162359 | A1 | 6/2010 | Casey et al. | |

* cited by examiner

*Primary Examiner* — Ian N Moore
*Assistant Examiner* — Mewale Ambaye
(74) *Attorney, Agent, or Firm* — Sutherland Asbill & Brennan LLP

(57) ABSTRACT

Certain embodiments of the invention may include systems, methods, and apparatus for modifying sensor time stamp data. According to an example embodiment of the invention, a method is provided for monitoring and correcting sample time stamps. The method can include receiving packet data from one or more sensors or intelligent electronic devices (IEDs); examining time stamps associated with the received packet data; and determining a variance between the time stamps or an offset between the time stamps and an accurate time source.

12 Claims, 3 Drawing Sheets

SYSTEMS, METHODS, AND APPARATUS FOR MODIFYING SENSOR TIME STAMP DATA

FIELD OF THE INVENTION

This invention generally relates to sensor data, and in particular to modifying sensor time stamp data.

BACKGROUND OF THE INVENTION

Sensors are utilized in numerous industrial applications for measuring and monitoring phenomena. In many applications, multiple sensors can be utilized in conjunction with a system, but connecting all of the sensors with their associated communication wires to a central panel can present many reliability issues, space challenges, interference, and other issues. To address some of these challenges and issues, sensors and intelligent electronic devices (IEDs) have been developed that can communicate over serial bus, Ethernet, etc., where the measured data can be digitized, time-stamped, formatted for communication, and sent through the data channel or network, eliminating many unnecessary cables.

In many cases, time stamps are applied to the data by the local sensors or IEDs. However, when the local clocks or time sources that provide the time stamps are not synchronized to a global time source, the received data, when re-assembled according to time stamps, can present an inaccurate representation of the monitored phenomena.

Synchronizing local time sources to reduce time stamp error associated with each sensor or IED may be possible, but it can be prohibitively expensive. For example, a broadcast global positioning system (GPS) signal may be received by sensors or IEDs for synchronization of each component's associated time source, but the GPS receivers may cost more than the sensors, or there may be line-of-sight restrictions that prohibit reception of the synchronization signals. High quality crystals may be utilized with local time sources, but drift over time can still be an issue that can cause loss of time-synchronization.

BRIEF SUMMARY OF THE INVENTION

Some or all of the above needs may be addressed by certain embodiments of the invention. Certain embodiments of the invention may include systems, methods, and apparatus for modifying sensor time stamp data.

According to an example embodiment of the invention, a method is provided for monitoring and correcting sample time stamps. The method can include receiving packet or datagram data from one or more sensors or intelligent electronic devices (IEDs); examining time stamps associated with the received packet or datagram data; and determining a variance between the time stamps or an offset between the time stamps and an accurate time source.

According to another example embodiment, a system is provided. The system can include one or more sensors or intelligent electronic devices (IEDs); a deep packet inspector (DPI) in communication with the one or more sensors or IEDs; at least one memory for storing data and computer-executable instructions; and at least one processor configured to access the at least one memory and further configured to execute the computer-executable instructions for receiving packet data from the one or more sensors or IEDs; examining time stamps associated with the received packet data; and determining a variance between the time stamps or an offset between the time stamps and an accurate time source.

According to another example embodiment, an apparatus is provided. The apparatus can include a deep packet inspector (DPI) comprising at least one memory for storing data and computer-executable instructions; and at least one processor configured to access the at least one memory and further configured to execute the computer-executable instructions for receiving packet data from one or more sensors or intelligent electronic devices (IEDs); examining time stamps associated with the received packet data; and determining a variance between the time stamps or an offset between the time stamps and an accurate time source.

Other embodiments, features, and aspects of the invention are described in detail herein and are considered to be a part of the claimed invention. Other embodiments and aspects can be understood with reference to the following detailed description, accompanying drawings, and claims.

BRIEF DESCRIPTION OF THE FIGURES

Reference will now be made to the accompanying figures and flow diagram, which are not necessarily drawn to scale, and wherein.

DETAILED DESCRIPTION OF THE INVENTION

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments of the invention may enable monitoring and revising time stamps associated with sensor data. According to certain example embodiments, a deep packet inspection may be performed at an aggregation point. According to example embodiments, the time stamps may be revised or re-stamped using a global or reference time source. For example, time derived from global positioning system (GPS) signals, or from a network may be utilized for revising the time stamps.

According to an example embodiment, deep packet inspection at an aggregation point (for example, a router or switch) may be utilized to examine time stamps from multiple sensors and/or intelligent electronic devices (IEDs). According to an example embodiment, the deep packet inspection may be utilized for examining time stamps. According to an example embodiment, messages or reports may be automatically transmitted if the variance among sensors or against an accurate time source exceeds a predetermined threshold. According to an example embodiment, time stamps may be revised or replaced if the variance among sensors or against an accurate time source exceeds a predetermined threshold.

In one example embodiment, a difference between the examined time stamps and the accurate time source may be reported. In another example embodiment, the IED time may be reset. In an example embodiment, the time stamp may be replaced, revised, or re-stamped by the deep packet inspector (DPI) device. In an example embodiment, the DPI device may be operable for receiving an accurate time and applying or re-stamping the IED data with the accurate time. In another example embodiment, the DPI device may be operable for re-stamping or revising the time stamps with a common time that may or may not be a guaranteed accurate time.

Various system components for monitoring and revising the data time stamps, according to example embodiments of the invention, will now be described with reference to the accompanying figures.

Figure 1:
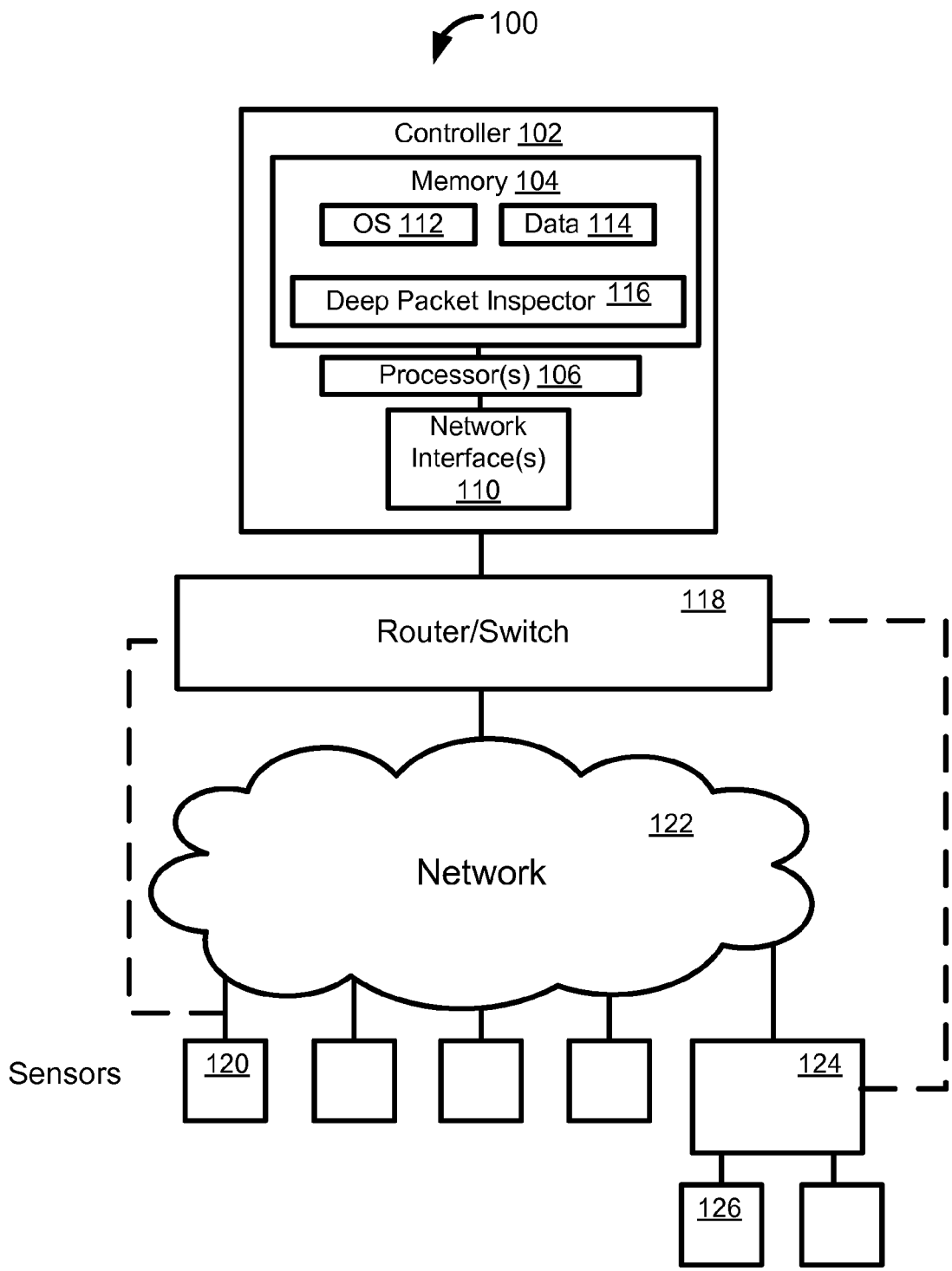
FIG. 1 is a block diagram of an illustrative sensor packet synchronization system, according to an example embodiment of the invention.

FIG. 1 is a block diagram of an illustrative sensor packet synchronization system 100, according to an example embodiment of the invention. In accordance with an example embodiment, the system 100 includes a controller 102 in communication with a router or switch 118. According to an example embodiment, the router or switch 118 may be in communication with one or more sensors 120 and/or IEDs 124. In an example embodiment, the router or switch 118 may be in communication with one or more sensors 120 and/or IEDs 124 via one or more networks 122. According to an example embodiment, basic sensors 126 (that measure phenomena, but may not be configured to format the data or apply time stamps) may be in communication with one or more IEDs 124.

According to an example embodiment, the sensors 120 may be configured for measuring phenomena, digitizing the associated data, applying a time-stamp to the data, formatting, and transmitting the data for communication via a channel or network 122 that may communicate with the router or switch 118. In another example embodiment, one or more IEDs 124 may be configured for receiving data from one or more basic sensors 126, digitizing the data, applying a time-stamp to the data, formatting, and transmitting the data for communication via a channel or network 122 that may communicate with the router or switch 118.

According to an example embodiment, the controller 102 in communication with the router or switch 118 may include a memory 104, one or more processors 106, and a network interface 110. In an example embodiment, the memory 104 may include an operating system (OS) 112 and data 114. In an example embodiment, the memory 104 may include a deep packet inspector module 116 that may provide instructions for the processor to monitor network traffic, inspect the data packets or datagram data, and revise the time stamps or report variances. According to an example embodiment, the controller 102 may include an accurate time source. According to an example embodiment, the controller 102 may include a receiver for receiving an accurate time source. In another example embodiment, the controller 102 may receive a global time via the network 122. According to an example embodiment, the deep packet inspector module 116 may inspect data packets associated with received data from the sensors 120, 126 or the IED 124.

According to an example embodiment, the deep packet inspector module 116 may be utilized in conjunction with the one or more processors 106 to inspect time stamps associated with received data. In an example embodiment, the controller 102 may report the variance against each other or against an accurate time source. In one example embodiment, a difference between the examined time stamps and the accurate time source may be reported. In another example embodiment, the sensor 120 or the IED 124 time may be reset. In an example embodiment, the time stamp may be replaced, revised, or re-stamped.

Figure 2:
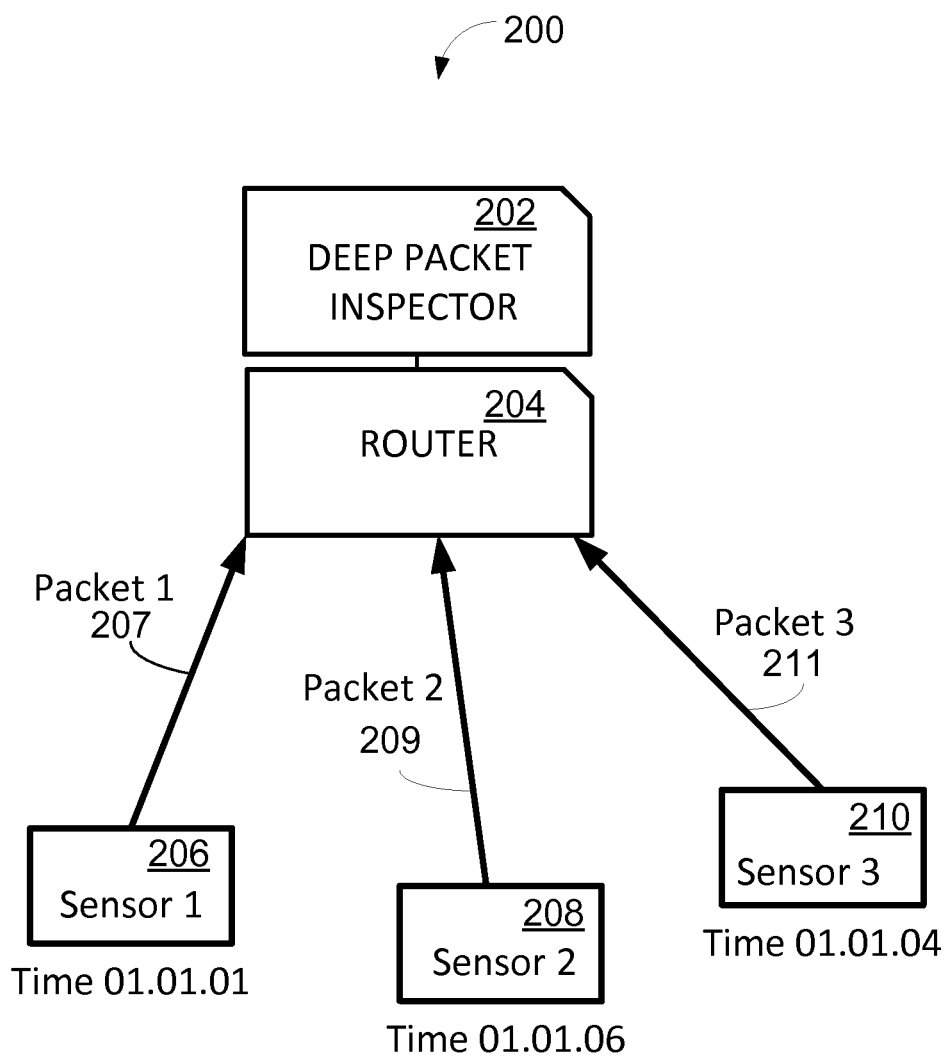
FIG. 2 is a block diagram of example sensor data packet time stamps, according to an example embodiment of the invention.

FIG. 2 is a block diagram of example sensor data packets with time stamps 200, according to an example embodiment of the invention. According to an example embodiment, an internet protocol (for example, Internet Protocol version 4 as described in the Internet Engineering Task Force publication, RFC 791) may be utilized for implementing inspection and/or time stamping procedures. According to an example embodiment, a deep packet inspector 202 may be utilized for monitoring data packets that are aggregated and/or routed via a router 204. In an illustrative example, suppose that a first sensor 206, a second sensor 208, and a third sensor 210 each measure phenomena at the same instant in time, say at 01.01.00. But due to different time sources associated with each of the sensors, a first time stamp of 01.01.01 is associated with the first sensor data packet 207, a second time stamp of 01.01.06 is associated with the second sensor data packet 209, and a third time stamp 01.01.04 is associated with the third sensor data packet 211. According to example embodiments, the deep packet inspector 202 may be utilized to take any one of a number of actions. According to a first example embodiment, and assuming that there are no significant differences in travel times for the three packets 207, 209, 211, the second time stamp associated with the second sensor data packet 209, and the third time stamp associated with the third sensor data packet 211 may be replaced with a time stamp equal to the first time stamp (01.01.01) associated with the first sensor data packet 207. According to another example embodiment, all three of the time stamps associated with the data packets 207, 209, 211 may be replaced with a time stamp associated with the system time, or with a more accurate time. In yet another example embodiment, if a particular sensor has a delay time associated with its data packet relative to the other data packets, such a delay time (or a mean delay time, for example) may be used as an offset for additional modifications to the replacement time stamp.

In another example embodiment, a difference between the packet time stamps and a system time may be reported without necessarily changing the time stamps associated with the packet data. Such reported difference data may be utilized for modifying or processing certain data associated with the measurement data, according to an example embodiment.

Figure 3:
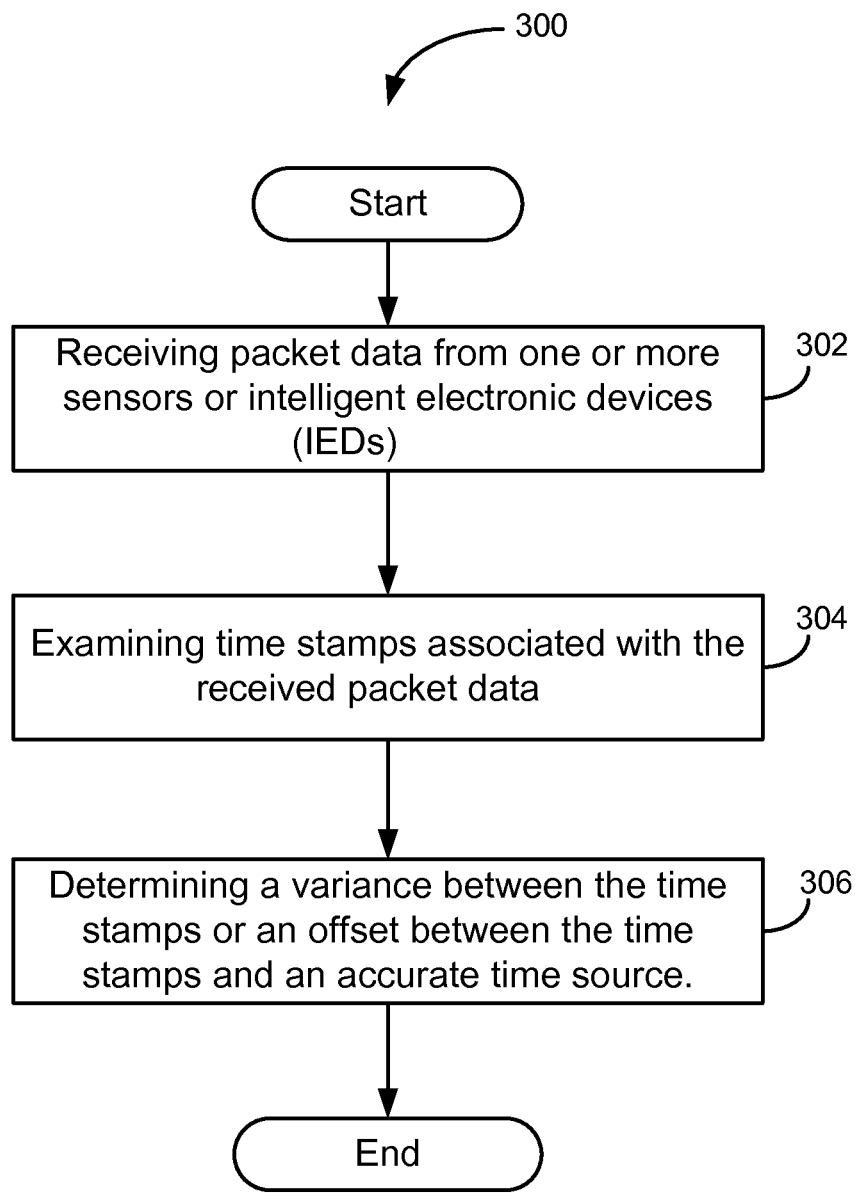
FIG. 3 is a flow diagram of an example method according to an example embodiment of the invention.

An example method 300 for monitoring and correcting sample time stamps will now be described with reference to the flow diagram of FIG. 3. In block 302, and according to an example embodiment, the method 300 includes receiving packet data from one or more sensors or intelligent electronic devices (IEDs). In block 304, and according to an example embodiment, the method 300 includes examining time stamps associated with the received packet data. In block 306, and according to an example embodiment, the method 300 includes determining a variance between the time stamps or an offset between the time stamps and an accurate time source. The method 300 ends after block 306.

Example embodiments of the method can further include reporting the variance or the offset. Example embodiments of the method can further include sending a time-reset command to one or more of the sensors or IEDs when the variance or offset meets or exceeds a predetermined threshold. Example embodiments of the method can further include revising the received packet data time stamp when the variance or offset meets or exceeds a predetermined threshold, wherein revising the received packet data time stamp can include replacing the time stamp with an updated or accurate time stamp. In accordance with example embodiments, receiving packet data can include receiving internet protocol packet data. In example embodiments, examining time stamps associated with the received packet data can include deep packet inspection.

According to another example embodiment, a system or apparatus is provided. The system includes one or more sensors or intelligent electronic devices (IEDs). The system or apparatus can include a deep packet inspector (DPI) in communication with the one or more sensors or IEDs. The system or apparatus can include at least one memory for storing data and computer-executable instructions; and at least one processor configured to access the at least one memory and further configured to execute the computer-executable instructions for receiving packet data from the one or more sensors or IEDs; examining time stamps associated with the received packet data; and determining a variance between the time stamps or an offset between the time stamps and an accurate time source.

According to example embodiments, the at least one processor is further configured for reporting the variance or the offset. In an example embodiment, the at least one processor is further configured for sending a time-reset command to one or more of the sensors or IEDs when the variance or offset meets or exceeds a predetermined threshold. In an example embodiment, the at least one processor is further configured for revising the received packet data time stamp when the variance or offset meets or exceeds a predetermined threshold. In an example embodiment, revising the received packet data time stamp includes replacing the time stamp with an updated or accurate time stamp. In an example embodiment, receiving packet data comprises receiving internet protocol packet data.

According to example embodiments, certain technical effects can be provided, such as creating certain systems, methods, and apparatus that can monitor and update time stamps associated with sensor data. In example embodiments of the invention, the sensor packet synchronization system 100 may include any number of hardware and/or software applications that are executed to facilitate any of the operations.

In example embodiments, one or more input/output (I/O) interfaces may facilitate communication between the sensor packet synchronization system 100 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with the sensor packet synchronization system 100. The one or more I/O interfaces may be utilized to receive or collect data and/or user instructions from a wide variety of input devices. Received data may be processed by one or more computer processors as desired in various embodiments of the invention and/or stored in one or more memory devices.

One or more network interfaces may facilitate connection of the sensor packet synchronization system 100 inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth™ (owned by Telefonaktiebolaget LM Ericsson) enabled network, a Wi-Fi™ (owned by Wi-Fi Alliance) enabled network, a satellite-based network, any wired network, any wireless network, etc., for communication with external devices and/or systems.

As desired, embodiments of the invention may include the sensor packet synchronization system 100 with more or less of the components illustrated in FIG. 1.

Certain embodiments of the invention are described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The claimed invention is:

1. A method, comprising executing computer executable instructions by one or more processors for monitoring and correcting sample time stamps, the method further comprising:
   receiving, by a router or a switch, Internet Protocol (IP) data from one or more sensors or intelligent electronic devices (IEDs), wherein the one or more sensors or IEDs are operable to monitor and revise data time stamps;
   examining, by the router or the switch, time stamps associated with the received Internet Protocol (IP) data;
   performing, by the router or the switch, deep packet inspection of the received Internet Protocol (IP) data;
   determining, by the router or the switch, a variance between the time stamps or an offset between the time stamps and an accurate time source;
   revising, by the router or the switch, at least one time stamp of the received Internet Protocol (IP) data, based at least in part on the determination;
   reporting, by the router or the switch, the variance or offset to other devices that utilize the datagram data; and
   sending a time-reset command to one or more of the sensors or IEDs when the variance or offset meets or exceeds a predetermined threshold.

2. The method of claim 1, further comprising revising the received Internet Protocol (IP) data time stamp when the variance or offset meets or exceeds a predetermined threshold.

3. The method of claim 2, wherein revising the received Internet Protocol (IP) data time stamp comprises replacing the time stamp with an updated or accurate time stamp.

4. The method of claim 1, wherein receiving Internet Protocol (IP) data comprises receiving datagram data.

5. A system comprising:
   one or more sensors or intelligent electronic devices (IEDs);
   a deep packet inspector (DPI) at a router or a switch, in communication with the one or more sensors or IEDs, and comprising at least one memory for storing data and computer-executable instructions; and at least one processor configured to access the at least one memory and further configured to execute the computer-executable instructions for:
      receiving Internet Protocol (IP) data from the one or more sensors or IEDs, wherein the one or more sensors or IEDs are operable to monitor and revise data time stamps;
      examining time stamps associated with the received Internet Protocol (IP) data;
      performing deep packet inspection of the received Internet Protocol (IP) data;
      determining a variance between the time stamps or an offset between the time stamps and an accurate time source; and
      revising at least one time stamp of the received Internet Protocol (IP) data, based at least in part on the determination;
      reporting, by the DPI, the variance or offset to other devices that utilize the Internet Protocol (IP) data; and
      sending a time-reset command to one or more of the sensors or IEDs when the variance or offset meets or exceeds a predetermined threshold.

6. The system of claim 5, wherein the at least one processor is further configured for revising the received Internet Protocol (IP) data time stamp when the variance or offset meets or exceeds a predetermined threshold.

7. The system of claim 6, wherein revising the received Internet Protocol (IP) data time stamp comprises replacing the time stamp with an updated or accurate time stamp.

8. The system of claim 5, wherein receiving Internet Protocol (IP) data comprises receiving datagram data.

9. An apparatus comprising:
   a deep packet inspector (DPI) at a router or a switch, comprising at least one memory for storing data and computer-executable instructions; and
   at least one processor configured to access the at least one memory and further configured to execute the computer-executable instructions for:
      receiving datagram data from one or more sensors or intelligent electronic devices (IEDs), wherein the one or more sensors or IEDs are operable to monitor and revise data time stamps;
      examining time stamps associated with the received Internet Protocol (IP) data;
      performing deep packet inspection of the received Internet Protocol (IP) data;
      determining a variance between the time stamps or an offset between the time stamps and an accurate time source; and
      revising at least one time stamp of the received Internet Protocol (IP) data, based at least in part on the determination; and
      reporting the variance or offset to other devices that utilize the Internet Protocol (IP) data; and
      sending a time-reset command to one or more of the sensors or IEDs when the variance or offset meets or exceeds a predetermined threshold.

10. The apparatus of claim 9, wherein the at least one processor is further configured for revising the received Internet Protocol (IP) data time stamp when the variance or offset meets or exceeds a predetermined threshold.

11. The apparatus of claim 10, wherein revising the received Internet Protocol (IP) data time stamp comprises replacing the time stamp with an updated or accurate time stamp.

12. The apparatus of claim 9, wherein receiving Internet Protocol (IP) data comprises receiving datagram data.

* * * * *